Patented Sept. 7, 1937

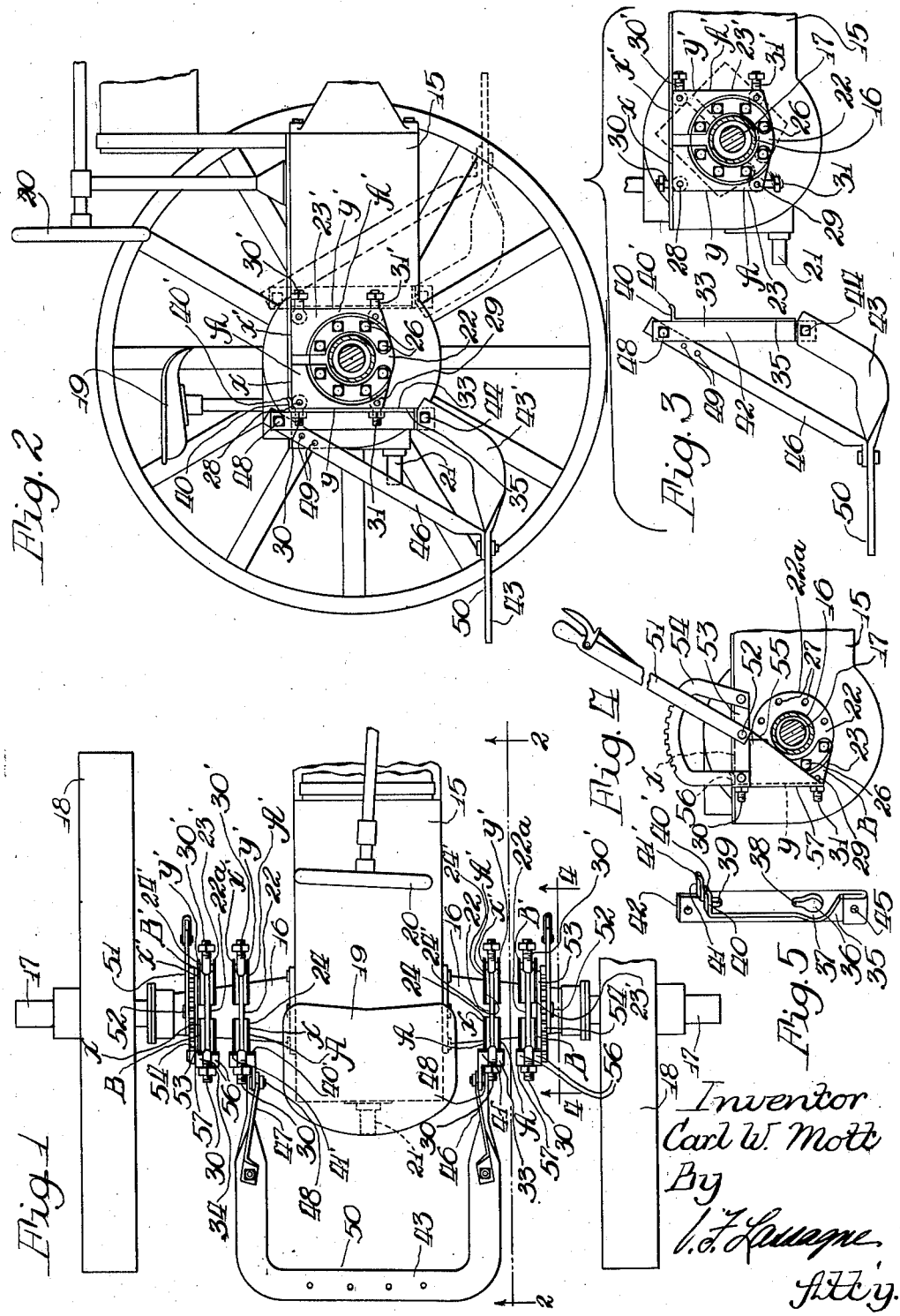

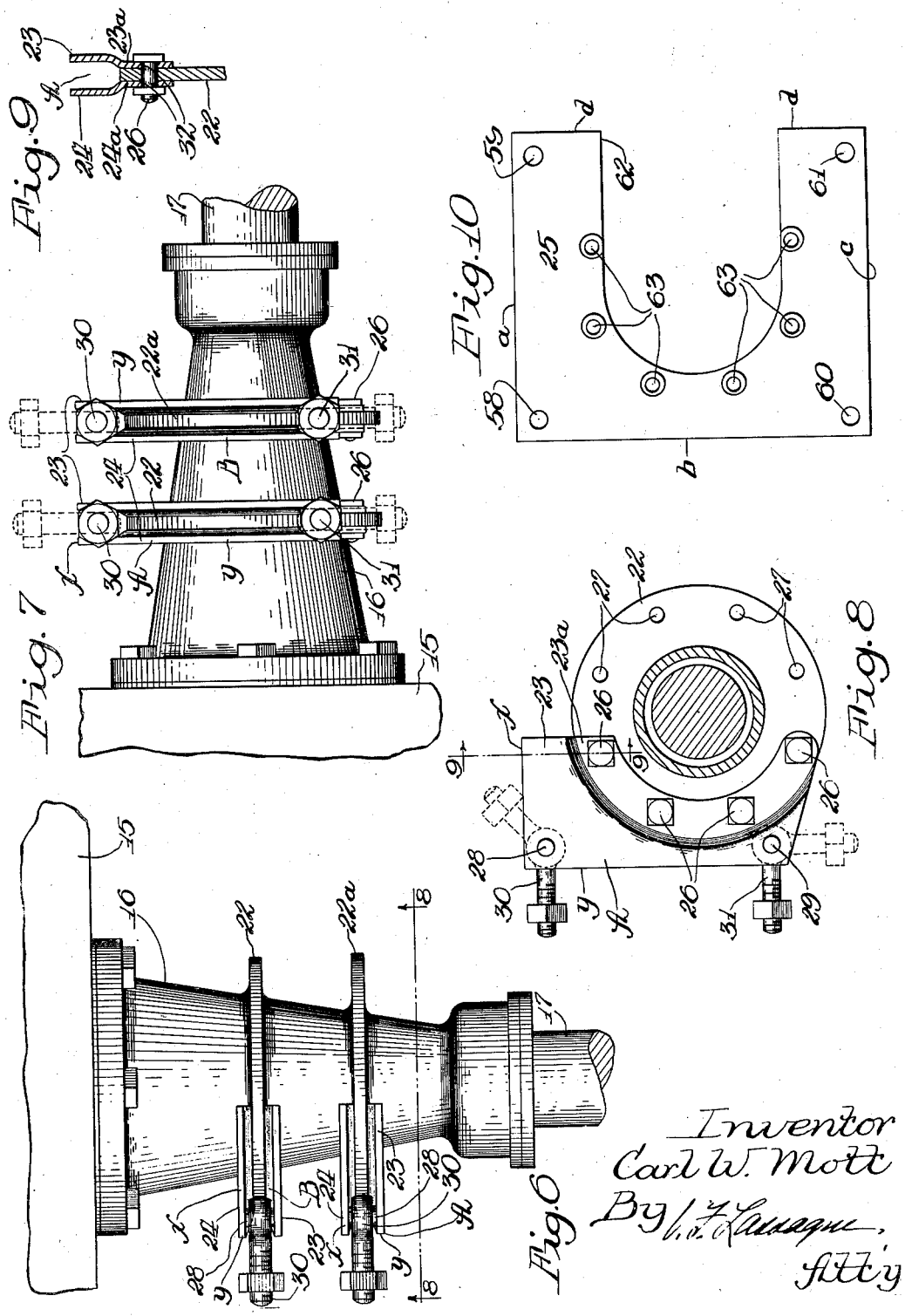

2,092,584

UNITED STATES PATENT OFFICE 2,092,584

IMPLEMENT COUPLING MEANS ON TRACTORS

Carl W. Mott, Rock Falls, Ill., assignor to International Harvester Company, a corporation of New Jersey Application July 5, 1935, Serial No. 29,938
Renewed January 29, 1937

17 Claims. (Cl. 280—33.44)

This invention relates to farm tractors and more particularly features of construction which facilitate the connection and disconnection of draft elements or supporting frames for the various implements that may be mounted on or coupled to a tractor.

The main object of the invention is to provide convenient and readily accessible coupling structure on a tractor axle housing and connection with the draft members or frame pieces of various implements in a quick and simple manner, as particularly desirable with farm tractors of the general purpose type.

Another object is to so form the coupling structure as to make it of practically universal adaptability, thus permitting the draft frame members of implements to be bolted or otherwise secured thereto at various positions or angles as required by the character or structure of the implement.

Another object is to so form the coupling structure that the usual lifting levers of the various implements may be secured to the coupling structure.

Other objects and advantages will appear in the following description of a preferred embodiment of the invention, as illustrated in the accompanying drawings, wherein;

Figure 1 is a plan view of the rear portion of a tractor having a novel draft coupling structure on the rear axle housing;

Figure 2 is a side view of Figure 1 with the right wheel removed looking along the line 2—2 of Figure 1;

Figure 3 is a detailed view of the axle housing and central body casting of the tractor and showing the drawbar attachment detached from the coupling structure on the rear axle; and, also Figure 3 shows in the dotted lines the coupling structure rotating about the axle structure;

Figure 4 is a side view looking in the direction of the arrows on line 4—4 of Figure 1 showing the hand lever secured to the draft coupling structure;

Figure 5 is a perspective view of the draw-bar supporting member;

Figure 6 is an enlarged plan view of the right rear axle housing with the draft coupling structure in place;

Figure 7 is a rear view of Figure 6 showing the draft coupling structure in place on the right rear axle housing;

Figure 8 is a side elevation on line 8—8 of Figure 6 looking in the direction of the arrows, showing the draft coupling structure secured to the rear axle housing;

Figure 9 is a sectional view on line 9—9 of Figure 8 looking in the direction of the arrows; and, Figure 10 is an enlarged view of a modification of one of the draft coupling plates.

In the construction illustrated the tractor has an oblong casing forming the rear end of the tractor body and containing the transmission and differential mechanism. The rear position of this casing 15 has bolted, or otherwise secured to it, on each side aligned tubular axle housings 16 containing the bearings for the axle shafts 17 which extend beyond the ends of the housing. Traction wheels 18 are adjustably secured to the axle ends. The casing 15 supports a centrally located driver's seat 19 in convenient relation to the usual steering wheel 20 and other controls not shown. The casing 15 has suitable bearings in its lower position for the central power take-off shaft 21 which projects from the rear wall thereof and is driven through suitable gearing within the casing.

In the present invention the opposite axle housings 16 are formed with integral flanges 22. There may be a second flange 22a on each housing spaced from the flange 22 if desired, in order to provide for the attachment of wider draft frames or for attachment in different positions laterally, of the draft frame and also the implement adjusting members may be secured to either the inner or outer flange members; but, the invention will be explained in connection with one such flange, as it is immaterial on which of the flanges the cooperating parts to be described are mounted.

The flanges 22 are preferably formed with suitable spaced bolt holes in the circumference thereof to provide means of attachment for right and left hand coupling members or plates 23 and 24, as best shown in Figures 6, 7, 8, and 9. The coupling members 23 and 24 may be formed as shown in Figure 10, as the horseshoe coupling member or plate 25 which may be used either as a right or left hand coupling member.

These plates 23 and 24 are formed with an arcuate depressed inner portion, as best shown in Figures 8 and 9, to fit against the flanges 22 to which they are bolted as shown, or otherwise secured. When in position, the plates 23 and 24 partially encircle the axle housing and are so spaced apart by the flange 22 and offset by the depressed portions 23a and 24a to form the horizontal attaching surface X and the vertical attaching surface Y. These surfaces X and Y are at right angles to each other, and a plurality of attaching surfaces X, Y, X', and Y' may be formed, as best shown in Figures 1, 2, and 3, by attaching a plurality of plates 23, 24, 23', and 24', as best shown in Figures 1, 2, and 3, so that attaching surfaces may be had in a horizontal plane parallel to the horizontal plane through the axle 17 and also vertical attaching surfaces in planes at right angles to the attaching surfaces X and X', as shown by the attaching surfaces Y and Y' in which the attaching surface Y is to the rear of the axle and the attaching surface Y' is forward of the rear axle. As shown in Figure 3 in the dotted lines the plates 23, 24, 23', and 24' may be rotated so that the attaching surfaces X and X', Y and Y' may be at an angle to a horizontal plane through the center of the axle by removing the bolts and replacing the bolts so that the plates 23, 24, and 23' and 24' are rotated about the flange 22. This may be done by removing the bolts 26 from the holes in the coupling members and resecuring the bolts 26 in the holes 27 of the flange 22.

The right and left hand coupling members 23 and 24 respectively are formed into a single coupling member by means of the upper and lower studs 28 and 29 which are so formed to act as a spacer for the coupling members 23 and 24 and also as a pivot for the upper and lower attaching members or bolts 30 and 31. The studs 28 and 29 are riveted at each end, thus forming a single coupling member in which the surfaces X and Y thereof are in alignment and also the holes 32 of the plate members 23 and 24 are in alignment so that the coupling support member A formed from the coupling members 23 and 24 may be readily attached to the flange 22 by the insertion of the bolts 26 through the holes 32 of the coupling members and through the holes 27 of the flange 22 thereby rigidly securing the coupling attaching member A to the rear axle housing 16. The swinging eye bolts 30 and 31 may be so pivoted that implement attaching members may be secured to the attaching surface Y, as shown in Figure 8, or, if necessary, the bolt 30 may be swung to secure an implement attaching member to the surface X, as shown in the dotted line of the bolt of Figure 8. As shown in Figures 1, 2, and 3 with the use of the coupling attaching members A and A', the bolts 30, 31, and 30' and 31' may be used to secure implement attaching members to the surfaces Y and Y' or, if necessary, the bolts 30 and 30' may be swung upwardly and implement attaching members may be secured to the attaching surfaces X and X'.

In Figure 1, the right and left hand draw-bar supporting members 33 and 34 respectively which are best shown in Figure 5 are secured to the attaching surface Y of the coupling attaching supports A which are secured to the flanges 22 on the axle housings 16. The draw-bar supporting member 33 is formed from a structural angle having the leg 35 secured to the attaching surface Y by means of the slotted hole 36 which also being swaged, forms an additional support and stiffening means 37 for the leg 35. The hole 36 is so enlarged, as shown, that the nut and the end of the bolt 31 may pass through the enlarged hole 36 and engage the narrow slot portion 38, as best shown in Figure 5. At the upper end of the leg 35 there is formed an elongated slot 39 and the sides of the slots 40 and 41 are bent downwardly and at right angles to the leg 35 and have formed at their outer ends the slightly curved portions 40' and 41' which act to guide the supporting member 33 on the surface X of the coupling support attachment A. The elongated slot permits the bolt 30 to be swung therethrough and permits the nut on the bolt 30 to then be tightened. In this manner, the right and left hand draw-bar attaching members 33 and 34 may be securely fastened to the surfaces Y of the coupling attachments A. The rearwardly extending leg 42 of the draw-bar supporting member is bent over at its lower end for increasing the stiffness of the leg 42, and the U-shaped draw-bar 43 to which the implement may be trailed therefrom is pivotally mounted to the draw-bar supporting member 33 by the bolt 44 and secured in the hole 45 of the draw-bar supporting member 33, as best shown in Figure 2.

The U-shaped draft frame 43 is designed to either support, or serve as a draft connection for implements of different types. It consists of a substantially horizontal portion having arms 43' inclined upwardly, as best shown in Figures 2 and 3, and which are secured to the draw-bar supporting members 33 and 34, as previously described. The draw-bar 43 is secured in its adjusted position by the right and left hand supporting braces 46 and 47 which are secured at their lower ends to the draw-bar 43 and at their upper ends to the rearwardly extending leg 42 of the draw-bar supporting member 33 in a suitable manner and in this case, by the bolt 48. The draw-bar may be adjusted within a given range by the holes 49 in the draw-bar supporting braces 46 and 47. It is thus seen that a suitable draw-bar attachment 50 may be assembled by means of the draw-bar supporting members 33 and 34 and the adjusting braces 46 and 47 and the whole atttachment may be supported as a whole by the members 40 and 41 and quickly secured to the coupling attaching members A by swinging the eye bolts 30 and 31 in place, the members 40 and 41 of the draw-bar supporting members 33 holding the draw-bar attachment 50 in place while the nuts on the eye bolts are quickly secured. In a like manner, the draw-bar attachment 50 may be readily disconnected as a whole by loosening the nuts on the eye bolts 30 and 31. The eye bolts 31 drop by themselves while the bolts 30 are quickly thrown through the slot 39 to the top of the coupling attaching member A, as best shown in the dotted position of the bolts 30 and 31 of Figure 8.

When this has been done, the draw-bar attachment 50 may be readily lifted off and the tractor driven to some other farm implement, and the implement can be quickly attached and the tractor driven away. With the arrangement of the parts as has been previously described, it may be understood that, if necessary, the draw-bar attachment may be reversed with the base of the U-shaped draw-bar 43 extending forwardly and the draw-bar supporting members 33 and 34 secured to the attaching surface Y' of the coupling attaching members A', as shown in the dotted position of Figure 2.

Figure 4 shows the construction necessary for a lever of a quickly detachable direct connected implement attachment which may be secured to the coupling attachment B and B', as shown in Figure 1. The usual coupling member B which has been previously described for the construction of the coupling member A is secured to the flange 22ᵃ or, if necessary, may be secured to any of the flanges 22 or 22ᵃ, as has been previously described, in order to support the usual lever 51 having the usual thumb latch, detent, and latch rod pivoted at 52 to the horizontal supporting member 53 to which the adjusting quadrant 54 having the usual notches is secured. The supporting member 53 is secured to a triangular shaped plate member 55 which has its rear portion bent inwardly to be secured against the surface Y of the coupling attachment member B. The inwardly extending portion of the member 55 is formed similarly to the leg 35 of the drawbar supporting member 33 so that the member 55 may be quickly attached and detached with the lever and quadrant secured thereto from the coupling member B.

The rearward portions 56 are similar in construction to the members 40, 41, 40', and 41', as best shown in Figure 5. Likewise, the inwardly extending portion 57 at its lower end has the usual enlarged hole 36 and slot 38 through which the bolt may be swung for securing the inwardly extending member 57 against the surface Y.

In the modification, as shown in Figure 10, the horseshoe shaped plate coupling member 25 is formed from a square plate having the surfaces a, b, c, d, at right angles to each other and parallel to each other so that various attaching members may be secured to any one of the surfaces or more than one, if necessary. This coupling member 25 is used in pairs, as previously described, for the coupling members 23 and 24, and is secured by the usual studs similar to the studs 29 and having eye bolts similar to those 30 and 31 previously described and best shown in Figure 8, pivoted thereon so that members may be attached by the usual eye bolts pivoted about the points 58, 59, 60, and 61. Eye bolts pivoted about 58 and 59 may secure members to the surface a and the same eye bolt pivoted about the point 58 and an eye bolt pivoted about 60 may be used to secure a member to the surface b. Likewise the same eye bolt pivoted about the point 61 may be used to secure a member to the surface c and similarly the eye bolt pivoted about 61 and the eye bolt pivoted about 59 may be used to secure a member to the surface d. The slot 62 is formed sufficiently large to pass over the rear axle housing 16 and the holes 63 are so positioned to align with the holes 27 of the flange 22. If necessary, the member 25 may be rotated and adjusted in a plurality of positions by aligning the holes 63 with the holes 27 about the flange 22 so that the member 25 may take a position similar to the dotted position of the coupling attaching members A and A', as shown in Figure 3. If necessary, the surfaces a, b, c, and d may take any other suitable geometrical structure, such as a hexagon, octagon or circle.

As will be obvious to those skilled in the art, other arrangements can be provided with the coupling plates, which have been previously described, where needed or desired, or other forms of draft frames may be used, and also other forms of lever attachments may be used; and, a wide range of utility is therefore attainable to meet any requirement arising in connection with the various implements and by those that may be mounted on the tractor. It is thereby understood that materials suitable to the stresses encountered in a coupling attachment of this nature are to be used. The preferred embodiment of the invention herein described is capable of certain modifications without departure from the scope of the invention to be defined in the following claims.

What is claimed is:

1. The combination with a tractor with flange portions laterally spaced thereon, of frame attaching members, coupling means adapted to be secured to said flange portions for connecting the frame attaching members thereto, each of said coupling means comprising spaced coupling members having means carried therebetween for detachably securing the attaching members thereto, and means for securing said coupling means to said flange portions.

2. The combination with a tractor having a rear axle housing with flange portions laterally spaced thereon and integral with said axle housing, of coupling means for draft members adapted to be secured to said flange portions, each of said coupling means comprising spaced coupling members and means for securing said coupling members together in spaced relation, and means for securing said coupling means to said flange portions.

3. The combination with a tractor having a rear axle housing with flange portions laterally spaced thereon and integral with said axle housing, of implement draft members, coupling means adapted to be secured to said flange portions for connecting the implement draft members thereto, each of said coupling means comprising spaced coupling members and means for securing said coupling members together in spaced relation, means for securing said coupling means to said flange portions, and means for securing said implement draft members to said coupling members.

4. The combination with a tractor having a rear axle housing with flange portions laterally spaced thereon, of a plurality of coupling means coaxially connected to each of said flange portions, each of said coupling means comprising spaced coupling members having edge portions forming a plurality of angularly related attaching surfaces, means for securing said coupling members together in spaced relation and with the edge portions of said coupling members in alignment, and means for securing each of said coupling means to said flange portions with the attaching surfaces of each of said coupling members in alignment in the same planes.

5. The combination with a tractor having a rear axle housing with flange portions laterally spaced thereon and integral with said axle housing, of implement draft members, coupling means connected to said flange portions for connecting the implement draft members thereto, each of said coupling means comprising spaced coupling members and means for securing said coupling members together in spaced relation, and means for attaching the aforesaid implement draft members, said means comprising a plurality of clamping means pivotally mounted on said coupling members.

6. The combination with a tractor having a rear axle housing with flange portions laterally spaced thereon and integral with said axle housing, of implement frame members, coupling means connected to each of said flange portions, each of said coupling means comprising spaced coupling members having edge portions forming a plurality of angularly related attaching surfaces, means for securing each of said coupling means to said flange portions with the attaching surfaces of each of said coupling members in alignment in the same planes, and securing means on the coupling members adjustable for attaching said implement frame members to any of said attaching surfaces.

7. The combination with a tractor having a rear axle housing with flange portions laterally spaced thereon, of coupling means connected to each of said flange portions, each of said coupling means comprising spaced coupling members having edge portions forming a plurality of angularly related attaching surfaces, means for securing said coupling members together in spaced relation, and attaching means pivotally mounted on the aforesaid securing means to swing through an arc.

8. The combination with a tractor having a rear axle housing with flange portions laterally spaced thereon, of coupling means connected to each of said flange portions, each of said coupling means comprising spaced coupling members having edge portions forming a plurality of angularly related attaching surfaces adjacent to each other, securing means for said coupling means together in spaced relation, attaching means pivotally mounted on the aforesaid securing means so placed that the attaching means may be swung at right angles to each adjacent attaching surface, and clamping elements on the aforesaid attaching means adjustable relative to said attaching surfaces.

9. The combination with a tractor having a rear axle housing with circular flange portions laterally spaced thereon and integral with said axle housing, of coupling means adapted to be connected to said flange portions, each of said coupling means comprising a pair of laterally spaced coupling members having one edge engageable with opposite sides of each flange portion, complementary means on said coupling means and the flanges for securing said coupling means to said flange portions at different locations around the flanges, selectively, whereby said coupling means may be adjusted relative to said flange portions.

10. The combination with a tractor having a rear axle housing with flange portions laterally spaced thereon and integral with said axle housing, of implement attaching members, coupling means connected to each of said flange portions, each of said coupling means comprising spaced coupling members engaging the opposite sides of one of said flanges, and means for securing said implement attaching members to said coupling members, said means comprising a plurality of pivotally mounted attaching means pivoted between the spaced coupling members.

11. The combination with a tractor having a rear axle housing with flange portions laterally spaced thereon and integral with said axle housing, of implement attaching members, coupling means connected to each of said flange portions, each of said coupling means comprising spaced coupling members having edge portions forming a plurality of adjacent attaching surfaces, said attaching surfaces displaced at right angles to each other, and clamping elements pivoted on each coupling means at the apex of adjacent attaching surfaces whereby said elements may be swung to secure the aforesaid implement attaching members to either of said adjacent surfaces.

12. The combination with a tractor, of implement attaching members, coupling means connected to said tractor, each of said coupling means having edge portions forming two angularly related attaching surfaces, attaching means pivotally mounted on said coupling means for securing the aforesaid implement attaching members to either attaching surface, said attaching members being provided with openings adapted to receive the attaching means whereby the attaching means may be swung through the openings in the attaching members and the attaching members secured to the aforesaid attaching surfaces.

13. The combination with a tractor, of coupling means secured thereto, said coupling means having edge portions forming two angularly related attaching surfaces, a frame attaching member, and spaced, shiftable, attaching elements pivotally mounted on said coupling means for securing said attaching member to either attaching surface.

14. The combination with a tractor, of coupling means rigidly secured thereto, said coupling means having an attaching surface and including spaced, shiftable, attaching elements pivotally mounted on the coupling means adjacent the attaching surface, and a frame attaching member mounted on the coupling means and secured in position against the attaching surface by the attaching elements, said frame attaching member having spaced slotted portions positioned for reception of the attaching elements when swung into attaching position.

15. The combination with a tractor having coupling means rigidly secured thereto, said coupling means having a substantially vertically extending attaching surface and an upwardly facing horizontally extending attaching surface, spaced attaching elements pivotally mounted on the coupling means, and a frame attaching member mounted on the coupling means with a portion thereof engaging the vertical attaching surface and a portion resting on the horizontal attaching surface and being secured to the coupling means by the attaching elements, said frame attaching member having spaced slotted portions located adjacent the attaching elements for the reception of the attaching elements when swung into securing position.

16. The combination with a tractor having opposite axle housings, of an implement draft frame comprising laterally spaced supporting members, radially projecting frame coupling members rigid with said housings and formed with peripheral edges constituting attaching surfaces for the supporting members of the draft frame, the attaching surfaces of the coupling members on the opposite axle housings being in transverse alignment, and shiftable attaching elements on the coupling members for clamping the supporting members of the implement draft frame against said attaching surfaces, said elements being movable to and from positions perpendicular to said surfaces to engage and release said supporting members.

17. The combination with a tractor, of coupling means rigidly secured thereto, said coupling means having a substantially vertically extending attaching surface and a horizontally extending attaching surface joining the top of the vertical surface, spaced attaching elements mounted on the coupling means, one of said elements being pivoted adjacent the junction of the attaching surfaces, and a frame attaching member mounted on the coupling means with a portion thereof engaging the vertical attaching surface and a horizontal portion resting on the horizontal attaching surface and being secured to the coupling means by the attaching elements, the horizontal portion of said frame attaching member and the adjoining portion of the vertical attaching surface being slotted for the reception of the pivoted attaching element when swung into securing position.

CARL W. MOTT.